E. K. RIDEAL AND H. S. TAYLOR.
APPARATUS AND PROCESS FOR GAS ANALYSIS.
APPLICATION FILED MAR. 5, 1919.
1,375,933.
Patented Apr. 26, 1921.
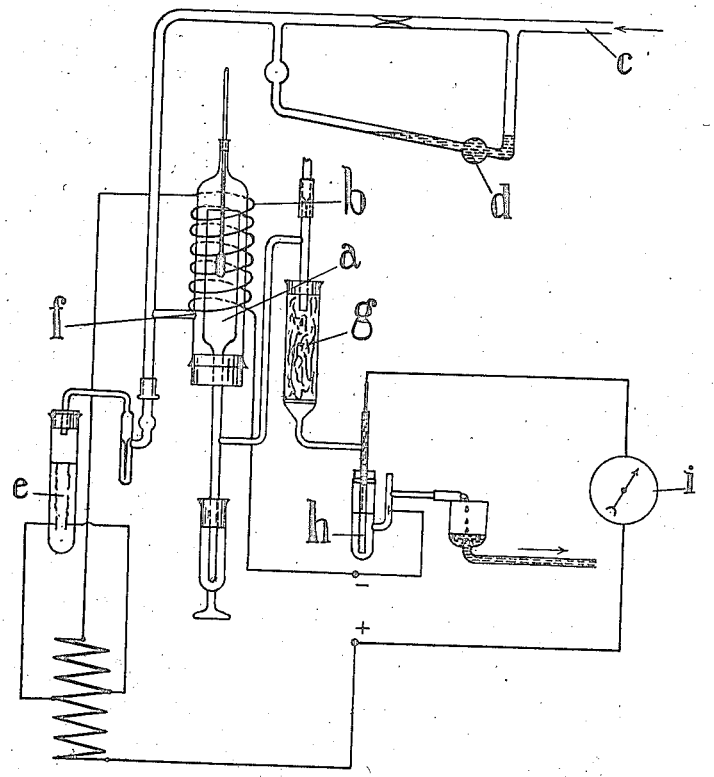
INVENTORS.
E.K. Rideal
H.S. Taylor.
BY
H. R. Kerslake ATTORNEY

UNITED STATES PATENT OFFICE.

ERIC KEIGHTLEY RIDEAL AND HUGH S. TAYLOR, OF LONDON, ENGLAND.

APPARATUS AND PROCESS FOR GAS ANALYSIS.

1,375,933.                     Specification of Letters Patent.    Patented Apr. 26, 1921.

Application filed March 5, 1919. Serial No. 280,774.

*To all whom it may concern:*

Be it known that we, ERIC KEIGHTLEY RIDEAL, Ph. D., of 48a Cornwall Gardens, London, S. W., 7, England, and HUGH STOTT TAYLOR, D. Sc., of 21 Gower street, London, W. C., 1, England, have invented certain new and useful Improved Apparatus and Processes for Gas Analysis, of which the following is a specification.

This invention relates to indicating or recording (or both indicating and recording) the quantities of carbon monoxid in hydrogen or in gases containing the same and is applicable also for similar purposes as for example for recording the percentage of carbon monoxid in the atmosphere of mines or for like operations, the object of the invention being to provide improved apparatus for the above purpose by means of which very accurate results may be obtained in practice.

The invention consists in a process and an apparatus for indicating or recording (or for both indicating and recording) quantities of carbon monoxid in hydrogen or gases containing the same applicable to like operations, comprising means for converting by a catalytic process of fractional combustion in the presence of added air or oxygen, the gas to be detected into a gas capable of being absorbed by a liquid the conductivity of which varies with the quantity of contained gas.

Further features of the invention will be apparent from the description given hereafter.

The accompanying drawing illustrates diagrammatically one form of apparatus in accordance with the invention.

In carrying our invention into effect in one convenient manner as, for example, in its application to the estimation of carbon monoxid in hydrogen or gases containing the same, we arrange for the fractional combustion of the carbon monoxid with a small amount of added air or oxygen in the presence of a catalyst, and thereafter allow the gas to pass through a suitable absorbent such as lime water whereby the carbon dioxid generated by combustion of the carbon monoxid in the catalyst chamber is completely absorbed.

The conductivity of the lime water varies with the quantity of carbon dioxid absorbed thereby and this property is employed for detecting such quantity by applying an electric current to the liquid and obtaining an indication or record (or both) by means of any suitable instrument or apparatus arranged in the circuit.

According to one convenient arrangement of apparatus we employ a catalyst chamber $a$ containing iron - chromium - cerium - oxid catalyst maintained (for example by the electric heating coil $b$) at a temperature of 200–250° C. through which the air-gas mixture is led, the gas being previously freed from impurities such as carbon dioxid and hydrogen sulfid by preliminary passage through caustic soda solution or otherwise. In the example shown, the gas enters at $c$ already so treated and passes through the gas meter $d$ while electrolytic gas $(2H_2+O_2)$ is generated at $e$ and the mixture admitted to the catalyst chamber at $f$. After such combustion the gas is led through a spiral bubbler or glass-wool column $g$ or other suitable absorption apparatus containing, say $\frac{1}{100}$ normal lime water solution, the gas and solution being passed through the bubbler or column in the same direction and both at regulated speeds. The lime water, after absorption of the carbon dioxid, passes through an overflow in the spiral or other outlet from the absorber to a small electrolytic cell $h$ in which its conductivity can be measured; the cell is so designed that with the solution of lime water chosen a high but adjustable resistance is obtained thus permitting the conductivity of the solution to be measured by application of a direct current at, say 200 volts without any disturbing influences being brought about by polarization effects at the electrodes.

The conductivity of the lime water which gives a measure of the quantity of carbon dioxid absorbed and therefore a measure of the quantity of carbon monoxid originally contained in the gas, may be recorded by placing in series a recording instrument $i$ of any suitable or usual type preferably adjusted so that the maximum deflection of the instrument corresponds to the current flowing in absence of carbon dioxid.

The sensitivity and range of the apparatus may be varied at will by adjusting the speeds of flow of the gas and lime water through the absorber.

It is to be understood that the invention may be applied with equal effect and like advantage to the detection or recording (or both) of any gas which by processes of fractional combustion in the presence of added air or oxygen may be converted into a gas which may be absorbed by a liquid, the conductivity of which varies with the quantity of contained gas.

We claim:—

1. A process of analyzing gases, which comprises passing the gas being tested, in contact with another substance capable of reacting thereupon, in contact with a catalyst capable of inducing reaction between such gas being tested and such other substance, bringing the gas containing the reaction product into contact with an absorbent of which the electrical conductivity will be varied by an amount dependent upon the amount of such reaction product, passing an electric current of known voltage through the said absorbent, and comparing the amperage of the current with that which would be produced by passing a current of like voltage under like conditions through the untreated absorbent.

2. A process of analyzing gas containing hydrogen and carbon monoxid, which comprises passing the gas under treatment in contact with an oxygen-containing reagent in contact with a catalyst capable of inducing oxidation of carbon monoxid, bringing the gas containing the reaction product into contact with an alkaline absorbent, passing an electric current of known voltage through the said absorbent and comparing the amperage of the current with that which would be produced by passing a current of like voltage under like conditions through the untreated absorbent.

3. In the process of analyzing gases containing hydrogen and carbon monoxid, the improvement which comprises adding an oxygen-containing gas, passing the gas mixture through a catalyst capable of inducing oxidation of the carbon monoxid, passing the gas through a solution of calcium hydrate in predetermined proportions, passing an electric current through said treated absorbent, and measuring the amperage of the current.

4. A process of analyzing gases containing hydrogen, carbon monoxid and the impurities capable of being absorbed by an alkali which comprises passing the gas through an alkali, then oxidizing the carbon monoxid content of the gas to carbon dioxid, then absorbing the carbon dioxid thereby produced in an alkaline solution, then passing an electric current through said treated absorbent, and measuring the amperage of the current.

5. An apparatus for the analysis of gases which comprises a measuring gas inlet, means for adding a reactive material to the gases, a catalyzer chamber, an absorption chamber, an electrolytic cell for treating the effluent of the latter, a source of current of known voltage for said cell and means for determining the amperage of said current.

In testimony whereof we have signed our names to this specification.

ERIC KEIGHTLEY RIDEAL.
HUGH S. TAYLOR.